United States Patent
Chen et al.

(10) Patent No.: US 9,854,234 B2
(45) Date of Patent: Dec. 26, 2017

(54) REFERENCE PICTURE STATUS FOR VIDEO CODING

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/803,736

(22) Filed: Mar. 14, 2013

(65) Prior Publication Data

US 2014/0119447 A1    May 1, 2014

Related U.S. Application Data

(60) Provisional application No. 61/718,629, filed on Oct. 25, 2012.

(51) Int. Cl.

| | | |
|---|---|---|
| *H04N 19/00* | (2014.01) | |
| *H04N 19/70* | (2014.01) | |
| *H04N 19/573* | (2014.01) | |
| *H04N 19/503* | (2014.01) | |
| *H04N 19/597* | (2014.01) | |
| *H04N 19/58* | (2014.01) | |
| *H04N 19/51* | (2014.01) | |

(52) U.S. Cl.
CPC ..... *H04N 19/00575* (2013.01); *H04N 19/573* (2014.11); *H04N 19/58* (2014.11); *H04N 19/597* (2014.11); *H04N 19/70* (2014.11); *H04N 19/503* (2014.11); *H04N 19/51* (2014.11)

(58) Field of Classification Search
CPC ............ H04N 7/50; H04N 7/26244; H04N 19/00575; H04N 19/573; H04N 19/58; H04N 19/597; H04N 19/70; H04N 19/51; H04N 19/50
USPC .................................................. 375/240.16
See application file for complete search history.

(56) References Cited

U.S. PATENT DOCUMENTS

| | | | |
|---|---|---|---|
| 8,170,108 B2 * | 5/2012 | Jeon ............... | H04N 19/597 348/218.1 |
| 2010/0002761 A1 | 1/2010 | Pandit et al. | |
| 2010/0002762 A1 | 1/2010 | Pandit et al. | |

(Continued)

FOREIGN PATENT DOCUMENTS

| | | |
|---|---|---|
| CN | 101072345 A | 11/2007 |
| JP | 2012191298 A | 10/2012 |
| WO | 2008047303 A2 | 4/2008 |

OTHER PUBLICATIONS

Chen et al., "Temporal motion vector prediction hook for MV-HEVC", 10-149 Oct. 2012, JCT-VC, 11th Meeting Shanghai, CN, all.*

(Continued)

*Primary Examiner* — Mohammed Rahaman
*Assistant Examiner* — Jimmy S Lee

(57) ABSTRACT

The techniques of this disclosure may be generally related to reference statues of pictures. The techniques may store the reference status information of reference pictures of a picture, at an instance when the picture is being coded. The techniques may then utilize the reference status information of the reference pictures of the picture, at the instance when the picture was coded, to inter-predict video blocks of a subsequent picture.

21 Claims, 4 Drawing Sheets

(56) References Cited

U.S. PATENT DOCUMENTS

| | | | |
|---|---|---|---|
| 2010/0027615 A1* | 2/2010 | Pandit | H04N 19/597 375/240.01 |
| 2011/0142130 A1 | 6/2011 | Lin et al. | |
| 2012/0230409 A1 | 9/2012 | Chen et al. | |
| 2012/0250773 A1 | 10/2012 | Chien et al. | |
| 2012/0257678 A1* | 10/2012 | Zhou | H04N 19/52 375/240.16 |
| 2012/0269275 A1 | 10/2012 | Hannuksela | |

OTHER PUBLICATIONS

Chen et al., Temporal motion vector prediction hook for MV-HEVC, Oct. 2012, JCT-VC.*

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "AHG10: Hooks related to motion for the 3DV extension of HEVC", MPEG Meeting; Jul. 11-20, 2012; Stockholm; (Motion Picture Expert Group or ISO/IEC JTC1/SC29/WG11), No. m25444, XP030053778, JCTVC-J0122, 20 pp.

Chen et al., "Temporal motion vector prediction hook for MV-HEVC", JCT-VC Meeting; MPEG Meeting; Oct. 10-19, 2012; Shanghai; (Joint Collaborative Team on Video Coding of ISO/IEC JTC1/SC29/WG1•1 and ITU-T SG.16); URL: http:// wftp3.1tu.int/av-arch/jctvc-site/, No. JCTVC-K0239, XP030113121, 8 pp.

International Search Report and Written Opinion—PCT/US2013/058276—ISA/EPO—Nov. 11, 2013, 13 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Second Written Opinion from International Application No. PCT/US2013/058276, dated Dec. 8, 2014, 8 pp.

International Preliminary Report on Patentability from International Application No. PCT/US2013/058276, dated Jan. 27, 2015, 10 pages.

Chen Y., et al., "AHG10: Motion related hooks for HEVC multiview/3DV extension based on long-term reference pictures", 10. JCT-VC Meeting; 101. MPEG Meeting; Nov. 7, 2012—Jul. 20, 2012; Stockholm; (Joint Collaborative Team on Video Coding of ISO/IEC JTC1/SC29/WG11 and ITU-T SG.16 ), No. JCTVC-J0121, Jul. 3, 2012 (Jul. 3, 2012), XP030112483, 8 pp.

Takahashi Y., et al., "High-level Syntax: Motion vector prediction issue for long-term reference picture", 10. JCT-VC Meeting; 101. MPEG Meeting; Nov. 7, 2012—Jul. 20, 2012; Stockholm; (Joint Collaborative Team on Video Coding of ISO/IEC JTC1/SC29/WG11 and ITU-T 5G.16); URL: http://wftp3.itu.int/av-arch/jctvc-site/, No. JCTVC-J0071 Jun. 29, 2012 (Jun. 29, 2012), XP030112433 (6 pp).

* cited by examiner

REFERENCE PICTURE STATUS FOR VIDEO CODING

This application claims the benefit of U.S. Provisional Application 61/718,629 filed Oct. 25, 2012, the entire content of which is incorporated by reference herein.

TECHNICAL FIELD

This disclosure relates to video coding and, more particularly, to techniques related to reference picture status for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

The techniques described in this disclosure are generally related to a video coding process, and storing reference status information of reference pictures at an instance when a picture that uses one or more of the reference pictures is coded. In this manner, even if the reference status of the reference pictures subsequently changes, a video coder is able to determine the reference status of the reference pictures at the instance when the picture was coded.

In one example, the disclosure describes a method for coding video data. The method includes storing reference status information of one or more reference pictures of a first picture, the reference status information indicating the reference status information of the one or more reference pictures at an instance when the first picture is coded, and coding a video block within a second, different picture based on the stored reference status information, at the instance when the first picture was coded, of the one or more reference pictures of the first picture.

In one example, the disclosure describes an apparatus for coding video data. The apparatus includes a video coder configured to store reference status information of one or more reference pictures of a first picture, the reference status information indicating the reference status information of the one or more reference pictures at an instance when the first picture is coded, and code a video block within a second, different picture based on the stored reference status information, at the instance when the first picture was coded, of the one or more reference pictures of the first picture.

In one example, the disclosure describes an apparatus for coding video data. The apparatus includes means for storing reference status information of one or more reference pictures of a first picture, the reference status information indicating the reference status information of the one or more reference pictures at an instance when the first picture is coded, and means for coding a video block within a second, different picture based on the stored reference status information, at the instance when the first picture was coded, of the one or more reference pictures of the first picture.

In one example, the disclosure describes a computer-readable storage medium having instructions stored thereon that when executed cause one or more processors to store reference status information of one or more reference pictures of a first picture, the reference status information indicating the reference status information of the one or more reference pictures at an instance when the first picture is coded, and code a video block within a second, different picture based on the stored reference status information, at the instance when the first picture was coded, of the one or more reference pictures of the first picture.

The details of one or more examples are set forth in the accompanying drawings and the description below. Other features, objects, and advantages will be apparent from the description and drawings, and from the claims.

DETAILED DESCRIPTION

Figure 1:
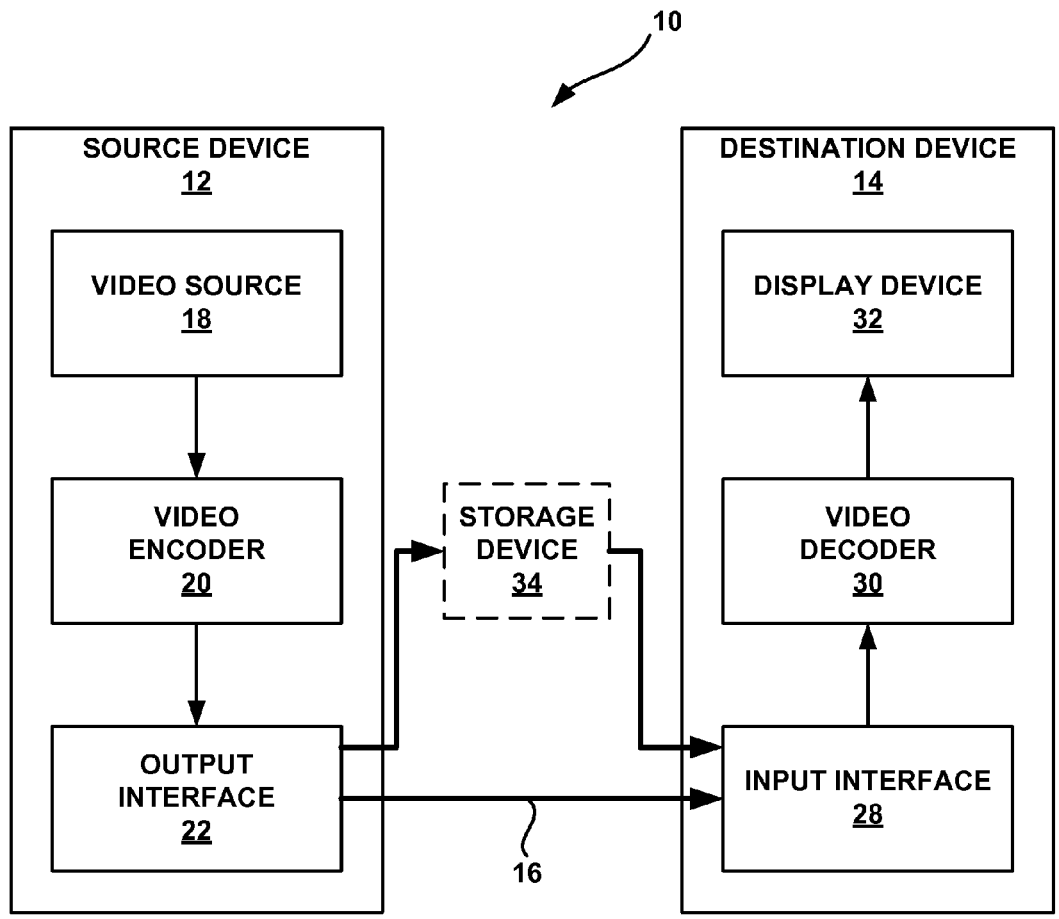
FIG. 1 is a block diagram illustrating an example video encoding and decoding system that may utilize the techniques described in this disclosure.

The techniques described in this disclosure are generally related to checking of the reference status of a picture in a video coding process. A video coder may designate (e.g., mark) a picture as "used for long-term reference," "used for short-term reference," or "unused for reference," as examples of reference statuses. For example, to inter-predict video blocks within a picture, the video coder may construct one or two reference picture lists (RefPicList0 and/or RefPicList1). The reference picture lists identify reference pictures that can be used to inter-predict the video blocks within the picture. In the techniques described in this disclosure, the video coder stores the reference status information for the reference pictures identified in RefPicList0 and/or RefPicList1 at the instance when the picture is coded.

In some cases, the video coder may need to determine the reference status information for the reference pictures of the picture when coding video blocks of a subsequent picture. However, the reference status of the reference pictures of the picture may have changed from when the video coder coded the picture to when the video coder is to code the subsequent picture. By storing the reference status information for the reference pictures of the picture, at the instance when the picture is coded, the techniques described in this disclosure may allow for the video coder to determine the reference status of the reference pictures of the picture when coding the subsequent picture.

For example, the video coder may need to obtain the reference status of the reference picture, prior to a time at which the reference status was changed, to implement a merge/skip mode or an advanced motion vector prediction (AMVP) mode for coding a video block. For purposes of illustration only, the techniques are described with respect to the merge/skip mode or the AMVP mode. However, the techniques described in this disclosure should not be considered limited to the merge/skip mode or the AMVP mode.

As described in more detail, in merge/skip mode or AMVP mode, the video coder utilizes a motion vector predictor to determine the motion vector for a block that is to be inter-predicted. One example of the motion vector predictor is a temporal motion vector predictor (TMVP).

The TMVP refers to a motion vector of a temporally neighboring block. The temporally neighboring block resides within a picture other than the picture that includes the block being inter-predicted. The temporally neighboring block may be a co-located block of a different picture than that associated with the video block being coded, although other non-co-located blocks might also be used. For ease of description, the block being inter-predicted is referred to as a current block in a current picture. The temporally neighboring block resides within a temporal picture, where the temporal picture is a picture other than the current picture.

The TMVP refers to a picture that is a reference picture of the temporal picture. For example, the video coder may construct two reference picture lists (RefPicList0 and RefPicList1) for the temporal picture. The TMVP, which is a motion vector for the temporally neighboring block, refers to a reference picture in one of RePicList0 or RefPicList1 for the temporal picture. In examples where the temporally neighboring block is inter-predicted with two motion vectors (i.e., bi-predicted), one motion vector refers to a reference picture in RefPicList0 and the other motion vector refers to a picture in RefPicList1. In these examples, there may be two TMVPs.

In some examples, to utilize the motion vector or vectors of the temporally neighboring block as a motion vector predictor or predictors for the current block (i.e., as the TMVP or TMVPs for the current block), the video coder may need to determine the reference status of the reference pictures to which the motion vector or vectors of the temporally neighboring block referred. In other words, the video coder may need to determine the reference status of reference pictures identified in RefPicList0 and/or RefPicList1 for the temporal picture at the instance when the video coder coded the temporal picture.

In general, the video coder may already be configured to store the reference status information for pictures. However, the reference status information for the pictures may change. Accordingly, the reference status of the pictures identified in RefPicList0 and RefPicList1 for the temporal picture, at the instance when the temporal picture was coded, may become lost when subsequently coding the current picture.

For instance, assume that the reference status of a reference picture for the temporal picture is "used for long-term reference picture," at the instance when the temporal picture was coded. Then, assume that the reference status of the reference picture changed from "used for long-term reference picture" to "used for short-term reference picture" prior to the coding of the current picture. In this example, the reference status of the reference picture being a "used long-term reference picture," at the instance when the video coder coded the temporal picture, may be lost when the video coder codes the current picture.

In the techniques described in this disclosure, the video coder stores the reference status information for reference pictures of a first picture (e.g., temporal picture), at the instance when the first picture is coded. Then, the reference status information for the reference pictures of the first picture, at the instance when the first picture was coded, is available when coding a second, different picture (e.g., the current picture). For example, if the motion vector for a block in the first picture is to be a motion vector predictor for a block in the second, different picture, then the video coder may be able to determine the reference status of the reference picture to which the motion vector for the block in the first picture referred, at the instance when the first picture was coded, to ensure proper inter-predicting of the block in the second, different picture.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to various video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Other examples of video compression standards include MPEG-2 and ITU-T H.263.

In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). The latest Working Draft (WD) of HEVC, and referred to as HEVC WD9 hereinafter, is available, as of Feb. 21, 2013, from http://phenix.int-evey.fr/jct/doc_end_user/documents/11_Shanghai/wg11/JCTVC-K1003-v10.zip.

The techniques of this disclosure, however, are not limited to any particular coding standard. Moreover, even if the techniques described in this disclosure may not necessarily conform to a particular standard, the techniques described in this disclosure may further assist in coding efficiency relative to the various standards. Also the techniques described in this disclosure may be part of future standards. For ease of understanding, the techniques are described with respect to the HEVC standard under development, but the techniques are not limited to the HEVC standard, and can be extended to other video coding standards or video coding techniques that are not defined by a particular standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, computer-readable storage medium such as a non-transitory computer-readable storage medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and may be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., RefPicList0 (L0) or RefPicList1 (L1)) for the motion vector.

A TU may be used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

For example, for video coding according to the high efficiency video coding (HEVC) standard currently under development, a video picture may be partitioned into coding units (CUs), prediction units (PUs), and transform units (TUs). A CU generally refers to an image region that serves as a basic unit to which various coding tools are applied for video compression. A CU typically has a square geometry, and may be considered to be similar to a so-called "macroblock" under other video coding standards, such as, for example, ITU-T H.264.

To achieve better coding efficiency, a CU may have a variable size depending on the video data it contains. That is, a CU may be partitioned, or "split" into smaller blocks, or sub-CUs, each of which may also be referred to as a CU. In addition, each CU that is not split into sub-CUs may be further partitioned into one or more PUs and TUs for purposes of prediction and transform of the CU, respectively.

PUs may be considered to be similar to so-called partitions of a block under other video coding standards, such as H.264. PUs are the basis on which prediction for the block is performed to produce "residual" coefficients. Residual coefficients of a CU represent a difference between video data of the CU and predicted data for the CU determined using one or more PUs of the CU. Specifically, the one or more PUs specify how the CU is partitioned for the purpose of prediction, and which prediction mode is used to predict the video data contained within each partition of the CU.

One or more TUs of a CU specify partitions of a block of residual coefficients of the CU on the basis of which a transform is applied to the block to produce a block of residual transform coefficients for the CU. The one or more TUs may also be associated with the type of transform that is applied. The transform converts the residual coefficients from a pixel, or spatial domain to a transform domain, such as a frequency domain. In addition, the one or more TUs may specify parameters on the basis of which quantization is applied to the resulting block of residual transform coefficients to produce a block of quantized residual transform coefficients. The residual transform coefficients may be quantized to possibly reduce the amount of data used to represent the coefficients.

A CU generally includes one luminance component, denoted as Y, and two chrominance components, denoted as U and V. In other words, a given CU that is not further split into sub-CUs may include Y, U, and V components, each of which may be further partitioned into one or more PUs and TUs for purposes of prediction and transform of the CU, as previously described. For example, depending on the video sampling format, the size of the U and V components, in terms of a number of samples, may be the same as or different than the size of the Y component. As such, the techniques described above with reference to prediction, transform, and quantization may be performed for each of the Y, U, and V components of a given CU.

To encode a CU, one or more predictors for the CU are first derived based on one or more PUs of the CU. A predictor is a reference block that contains predicted data for the CU, and is derived on the basis of a corresponding PU for the CU, as previously described. For example, the PU indicates a partition of the CU for which predicted data is to be determined, and a prediction mode used to determine the predicted data. The predictor can be derived either through intra-(I) prediction (i.e., spatial prediction) or inter-(P or B) prediction (i.e., temporal prediction) modes. Hence, some CUs may be intra-coded (I) using spatial prediction with respect to neighboring reference blocks, or CUs, in the same frame, while other CUs may be inter-coded (P or B) with respect to reference blocks, or CUs, in other frames.

Upon identification of the one or more predictors based on the one or more PUs of the CU, a difference between the original video data of the CU corresponding to the one or more PUs and the predicted data for the CU contained in the one or more predictors is calculated. This difference, also referred to as a prediction residual, comprises residual coefficients, and refers to pixel differences between portions of the CU specified by the one or more PUs and the one or more predictors, as previously described. The residual coefficients are generally arranged in a two-dimensional (2-D) array that corresponds to the one or more PUs o the CU.

To achieve further compression, the prediction residual is generally transformed, e.g., using a discrete cosine transform (DCT), integer transform, Karhunen-Loève (K-L) transform, or another transform. The transform converts the prediction residual, i.e., the residual coefficients, in the spatial domain to residual transform coefficients in the transform domain, e.g., a frequency domain, as also previously described. The transform coefficients are also generally arranged in a 2-D array that corresponds to the one or more TUs of the CU. For further compression, the residual transform coefficients may be quantized to possibly reduce the amount of data used to represent the coefficients, as also previously described.

To achieve still further compression, an entropy coder subsequently encodes the resulting residual transform coefficients, using Context Adaptive Variable Length Coding (CAVLC), Context Adaptive Binary Arithmetic Coding (CABAC), Probability Interval Partitioning Entropy Coding (PIPE), or another entropy coding methodology. Entropy coding may achieve this further compression by reducing or removing statistical redundancy inherent in the video data of the CU, represented by the coefficients, relative to other CUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may be configured in accordance with techniques of this disclosure. For example, video encoder 20 and video decoder 30 may be configured to store reference status information for reference pictures of each picture, at the instance when the picture is coded. As examples, the reference status information indicates whether the reference pictures are identified as "used for short-term reference," "used for long-term reference," or "unused for reference." As described in more detail, video encoder 20 and video decoder 30 may rely upon the reference status information for a reference picture of a picture, at the instance the picture was coded, to inter-predict a block of a subsequent picture.

For example, video encoder 20 and video decoder 30 may be configured to implement the merge/skip mode or advanced motion vector prediction (AMVP) mode to inter-predict a current block of a current picture. It should be understood that although the techniques are described with respect to the merge/skip mode and the AMVP mode, the techniques are not limited to apply only to the merge/skip mode and the AMVP mode. Video encoder 20 and video decoder 30 may be configured to implement the techniques described in this disclosure even in examples where merge/skip mode or AMVP mode are not utilized for inter-prediction.

In merge/skip mode or AMVP mode, video encoder 20 does not signal and video decoder 30 does not receive information for the actual motion vector of the current block. Rather, video encoder 20 signals and video decoder 30 receives information from which video decoder 30 derives the motion vector of the current block.

For example, in merge/skip mode or AMVP mode, video encoder 20 and video decoder 30 each construct a list of candidate motion vector predictors. A motion vector predictor is a motion vector for a block other than the block being inter-predicted (i.e., a block other than the current block). For example, video decoder 30 may determine whether blocks that spatially neighbor the current block (i.e., blocks in the current picture that neighbor the current block) are inter-predicted, and include the motion vector or vectors of the spatially neighboring blocks in the list of candidate motion vector predictors.

As another example, video decoder 30 may determine whether a block that temporally neighbors the current block (i.e., a block in a picture other than current picture) is inter-predicted, and include the motion vector or vectors for the temporally neighboring block in the list of candidate motion vector predictors. The picture that includes the temporally neighboring block is referred to as a temporal picture because the temporal picture is coded or displayed at times different than when the current picture is coded or displayed. For example, the temporal picture is a picture that is coded before the current picture, but may be displayed earlier or later than the current picture.

In some multiview coding techniques, the temporal picture may be a picture in a different view than the picture that includes the current block. In this example, the temporal picture and the current picture may be displayed at the same time. However, the picture in the different view may be coded at a time different than the time when the current picture is coded. Accordingly, the temporal picture may be picture in a same view as the current picture or a picture in a different view as the current picture. In either example, the temporal picture is a picture different than the current picture (i.e., different than the picture that includes the current block that is to be predicted).

In some examples, the temporally neighboring block may encompass a same area in the temporal picture that the current block encompasses in the current picture. In this example, the temporally neighboring block may be considered as being co-located with the current block.

In some examples, the temporally neighboring block may be located to the bottom-right of where the current block would be located in the temporal picture. For instance, video encoder 20 and video decoder 30 may determine the location of a block in the current picture that is located to the bottom-right of the current block. Video encoder 20 and video decoder 30 may utilize the determined location information of the bottom-right block, in the current picture, to identify a block in the temporal picture. This identified block in the temporal picture is another example of a temporally neighboring block.

The motion vectors for the spatially neighboring blocks that form motion vector predictors for the current block may be referred to as spatial motion vector predictors (SMVPs). The motion vector or vectors for the temporally neighboring block that form a motion vector predictor or predictors for the current block may be referred to as a temporal motion vector predictor or predictors (TMVP or TMVPs). Accordingly, video decoder 30 may construct a list of candidate motion vector predictors that include SMVPs and/or TMVPs. Video encoder 20 may utilize a similar technique to also construct a list of candidate motion vector predictors on the source device 12 side.

Video encoder 20 may signal an index into the list of candidate motion vector predictors, and video decoder 30 may select a motion vector predictor or motion vector predictors based on the signaled index into the list of candidate motion vector predictors. Video decoder 30 utilizes the motion vector predictor or predictors to derive the motion vector or vectors for the current block.

For example, in merge/skip mode, video decoder 30 sets the motion vector or vectors of the current block equal to the selected motion vector predictor or predictors. In AMVP mode, in addition to signaling an index into the list of candidate motion vector predictors, video encoder 20 may also signal motion vector difference (MVD) between the selected motion vector predictor or predictors and the actual motion vector or vectors of the current block. In this example, video decoder 30 may receive the MVD and determine the motion vector or vectors of the current block based on the MVD and the selected motion vector predictor or predictors.

In some examples, to implement merge/skip mode or AMVP mode, video encoder 20 and video decoder 30 may need to determine the reference status of a reference picture of a picture at the instance when the picture was coded. For example, to utilize the TMVP, video encoder 20 and video decoder 30 may need to determine the reference status of the reference pictures of the temporal picture.

For instance, when coding the temporal picture, video encoder 20 and video decoder 30 may have each constructed one or two reference picture lists (i.e., RefPicList0 for the temporal picture and RefPicList1 for the temporal picture). RefPicList0 and RefPicList1 for the temporal picture identify reference pictures that can be used to inter-predict the blocks of the temporal picture, including reference pictures that are used to inter-predict the temporally neighboring block. If the temporally neighboring block is uni-predicted (i.e., predicted with one motion vector), the motion vector for the temporally neighboring block may refer to a reference picture in RefPicList0 or a reference picture in RefPicList1. If the temporally neighboring block is bi-predicted (i.e., predicted with two motion vectors), a first motion vector for the temporally neighboring block may refer to a reference picture in RefPicList0, and a second motion vector for the temporally neighboring block may refer to a reference picture in RefPicList1.

If video encoder 20 and video decoder 30 determine that the motion vector or vectors for the temporally neighboring block are to be included in the list of candidate motion vector predictors for the current block, or determine that the motion vector or vectors for the temporally neighboring block are to be used for deriving the motion vector or vectors of the current block, video encoder 20 and video decoder 30 may need to determine the reference status of the reference picture or pictures to which the motion vector or vectors of the temporally neighboring block referred, at the instance when the temporal picture was coded. For example, assume that the temporally neighboring block is uni-predicted with a motion vector that refers to the third picture in RefPicList0 of the temporal picture. In this example, video encoder 20 and video decoder 30 may need to determine the reference status of the third picture in RefPicList0 of the temporal picture, at the instance when video encoder 20 and video decoder 30 coded the temporal picture.

For example, HEVC WD9, in sub-clause 8.5.3.1, defines the function LongTermRefPic. HEVC WD9, in sub-clause 8.5.3.1, states the following:

The function LongTermRefPic(picX, refIdx, LX) with X being either 0 or 1, is defined as follows. If the picture with index refIdx from reference picture list LX of the picture picX was marked as "used for long term reference" at the time when picX was the current picture, LongTermRefPic (picX, refIdx, LX) is equal to 1; otherwise LongTermRefPic (picX, refIdx, LX) is equal to 0.

Keeping with the previous example (e.g., the temporally neighboring block is uni-predicted with a motion vector that refers to the third picture in RefPicList0 of the temporal picture), to implement the LongTermRefPic function for the current block in the current picture, picX equals the temporal picture, refIdx equals 2 (assuming that the index for the first reference picture is 0), and LX equals RefPicList0. In other words, in this example, the LongTermRefPic function may be considered as LongTermRefPic(temporal picture, 2, RefPicList0). In this example, the LongTermRefPic function is equal to one, if the third picture in RefPicList0 for the temporal picture was identified as "used for long term reference," at the instance when video encoder 20 and video decoder 30 coded the temporal picture. Also, in this example, the LongTermRefPic function is equal to zero, if the third picture in RefPicList0 for the temporal picture was not identified as "used for long term reference," at the instance when video encoder 20 and video decoder 30 coded the temporal picture.

In accordance with the above example, the LongTermRefPic function is based upon the reference status of a reference picture of the temporal picture, at the instance when the temporal picture was coded (i.e., "at the time when picX was the current picture" as stated in HEVC WD9). If the reference status of the reference picture of the temporal picture, at the instance when the temporal picture was coded, is lost, video encoder 20 and video decoder 30 may not be able to conform to the requirements of the HEVC standard. For example, if the reference status of the reference picture of the temporal picture, at the instance when the temporal picture was coded, is lost, video encoder 20 and video decoder 30 may not be able to implement the LongTermRefPic function.

It should be understood that the description of the LongTermRefPic function in the HEVC WD9 is provided merely for purposes of illustration, and should not be considered limiting. The techniques described in this disclosure may be applicable for purposes other than the LongTermRefPic function, as well as applicable for standards other than the HEVC standard.

In accordance with the techniques described in this disclosure, video encoder 20 and video decoder 30 store reference status information for the reference pictures of each picture, at the instance when the picture is coded. In this way, if the motion vector or vectors of a block of the picture are later utilized as TMVP or TMVPs for a current block of a current picture, the reference status information for the reference pictures of the picture is available.

There may be various ways in which video encoder 20 and video decoder 30 may store the reference status information for reference pictures of a picture. As one example, video encoder 20 and video decoder 30 may store a list of flags for each one of the reference picture lists of the picture. The value of the flag may be one if the reference picture is identified as "used for long-term reference," at the instance when the picture is coded. The value of the flag may be zero if the reference picture is not identified as "used for long-term reference," at the instance when the picture is coded.

For example, video encoder 20 and video decoder 30 may each maintain a list of flags, referred to as usedForLongTermX, for RefPicListX, where X equals 0 or 1. For instance, to code a picture, video encoder 20 and video decoder 30 may each construct RefPicList0 for the picture and/or RefPicList1 for the picture. In this example, usedForLongTerm0 may include the flag value of one for the reference pictures in RefPicList0 that are identified as "used for long-term reference," and may include a flag value of zero for the reference pictures in RefPicList0 that are not identified as "used for long-term reference." Similarly, usedForLongTerm1 may include the flag value of one for the reference pictures in RefPicList1 that are identified as "used for long-term reference," and may include the flag value of zero for the reference pictures in RefPicList1 that are not identified as "used for long-term reference."

In other words, after video encoder 20 and video decoder 30 construct RefPicListX for the picture, video encoder 20 and video decoder 30 may set the value of usedForLongTermX[i] equal to one if picture identified as RefPicListX[i] is marked as "used for long-term reference" and to zero otherwise. In some examples, video encoder 20 and video decoder 30 may store the usedForLongTermX list of flags in respective decoded picture buffers (DPBs); however, it may be possible for video encoder 20 and video decoder 30 to store the usedForLongTermX list of flags in locations other than respective DPBs. In general, the usedForLongTermX list of flags may be available for each reference picture list for each picture in respective DPBs.

The DPB of video encoder 20 and the DPB of video decoder 30 may store decoded pictures, as well as information regarding the decoded pictures. For example, as part of the encoding process of a picture, video encoder 20 decodes the encoded blocks of the picture and stores the decoded picture in the DPB of video encoder 20 so that video encoder 20 can utilize the decoded picture for inter-predicting subsequent pictures. Video decoder 30 may decode a picture and store the decoded picture in its DPB so that video decoder 30 may utilize the decoded picture for inter-predicting subsequent pictures. Accordingly, the DPB of video encoder 20 and the DPB of video decoder 30 may be suitable locations to store the reference status information for reference pictures of a picture, at the instance when the picture is coded (i.e., encoded or decoded, as applicable).

In the techniques described in this disclosure, video encoder 20 and video decoder 30 may implement the LongTermRefPic function using stored reference status information for a picture, at the instance when the picture is coded. For example, the LongTermRefPic(picX, refIdx, LX) returns the value of usedForLongTermX[refIdx] of picX. For instance, video encoder 20 and video decoder 30 may determine the reference status of a reference picture a picture, at the instance when the picture was coded, based on the value stored in userForLongTermX[refIdx].

As one example, assume that picX is the temporal picture that includes the temporally neighboring block whose motion vector or vectors are used to determine the motion vector or vectors of the current block. Also, assume that the temporally neighboring block is bi-predicted with one motion vector that refers to the second reference picture in RefPicList0 of the temporal picture (i.e., refIdx for RefPicList0 is 1), and another motion vector that refers to the fourth reference picture in RefPicList1 of the temporal picture (i.e., refIdx for RefPicList1 is 3). In this example, to implement the LongTermRefPic(temporal picture, 1, RefPicList0) function, video encoder 20 and video decoder 30 would determine the value stored in usedForLongTerm0[1] for the temporal picture. To implement the LongTermRefPic (temporal picture, 3, RefPicList1) function, video encoder 20 and video decoder 30 would determine the value stored in usedForLongTerm1[3] for the temporal picture. In this manner, video encoder 20 and video decoder 30 may be able to determine the reference status of the reference pictures of the temporal picture, at the instance when the temporal picture was coded, when coding the current picture.

The reference status information of the reference pictures of a picture, at the instance when the picture is coded, should not be confused with the general status marking of the pictures that video encoder 20 and video decoder 30 may otherwise perform. For example, video encoder 20 and video decoder 30 may already be configured to designate (i.e., mark) pictures as "used for long-term reference," "used for short-term reference," or "unused for reference," and store such designations in respective DPBs. The designations of these pictures may change. For instance, a picture that is currently stored in the DPB may be marked as "used for short-term reference," but may change to "used for long-term reference." In this case, video encoder 20 and video decoder 30 may store the "used for long-term reference" designation of the picture in respective DPBs.

The marking of a picture as "used for long-term reference," "used for short-term reference," or "unused for reference" may indicate the current status of the picture. However, the current status of the picture may not provide any information regarding the previous status of the picture, much less the status of the picture when that picture was used as a reference picture.

As described above, the usedForLongTermX list of flags, as one example, may store the status of the reference pictures when the reference pictures were used to inter-predict a picture. In this manner, there may be a usedForLongTermX list of flags that is associated with each picture. For example, during the coding of a first picture, video encoder 20 and video decoder 30 may store usedForLongTerm0 and/or usedForLongTerm1 list of flags that are associated with the first picture. During the coding of the second picture, video encoder 20 and video decoder 30 may store a usedForLongTerm0 and/or usedForLongTerm1 list of flags that are associated with the second picture, and so forth.

The usedForLongTerm0 and/or usedForLongTerm1 list of flags that are associated with the first picture may be different than the usedForLongTerm0 and/or usedForLongTerm1 list of flags that are associated with the second picture. For example, even if the first picture and the second picture used one or more of the same reference pictures for inter-prediction, it may be possible that the reference status for the reference pictures, used by both the first and second picture, changed from when video encoder 20 or video decoder 30 coded the first picture to when video encoder 20 and video decoder 30 coded the second picture. The usedForLongTerm0 and/or usedForLongTerm1 list of flags for a picture are unique to that picture, and video encoder 20 and video decoder 30 may store the usedForLongTerm0 and/or usedForLongTerm1 list of flags for each picture that is coded.

Accordingly, in the techniques described in this disclosure, video encoder 20 and video decoder 30 may be configured to store the current status of a picture, as well as the status of the picture when that picture was a reference picture for another picture, at the instance when the another picture was coded. In some cases, such as when using TMVP or TMVPs, coding the current block should not depend on the current status of a picture that was a reference picture for the temporally neighboring block. Rather, the status of the picture, when that picture functioned as the reference picture for the temporally neighboring block, may be relevant. The techniques described in this disclosure allow for video encoder 20 and video decoder 30 to store the reference status information for reference pictures of the temporal picture, at the instance when the temporal picture was coded.

As described above, the TMVP or TMVPs are a motion vector or motion vectors of a temporally neighboring block. In some examples, the motion vector or motion vectors of the temporally neighboring block may refer to a picture or pictures in the same view as the temporal picture and the current picture. However, the techniques described in this disclosure are not so limited.

The techniques described in this disclosure may be extended to multiview coding. In multiview coding, there are multiple views that each include pictures. For example, a first view may include a first set of pictures, and a second view may include a second set of pictures. There may be more views than the first and second views. The first set of pictures and the second set of pictures may include substantially similar video content, but with horizontal disparity. When a viewer views both the first and second set of pictures simultaneously, the viewer perceives 3D video that encompasses a 3D volume, rather than being constrained to the 2D area of display device 32.

In non-multiview coding, there may only be one view. In these examples, the motion vector or vectors of the temporally neighboring block may refer to pictures in the same view as the temporal picture. However, in multiview coding, the motion vector or vectors of the temporally neighboring block may refer to pictures in another view than the view that includes the temporal picture. For example, in multiview coding, the temporal picture and the current picture may be in the same view, but the motion vector or vectors for the temporal picture refer to pictures in views other than the view that includes the temporal picture and the current picture.

Motion vectors that refer to pictures in another view may be referred to as disparity motion vectors. Accordingly, in examples where the motion vector or vectors of the temporally neighboring block refer to pictures in another view, the TMVP or TMVPs may be a disparity motion vector or disparity motion vectors.

In some examples, multiview coding may require that the picture in the other view, which is used to inter-predict a block in a current picture in the current view, be displayed at the same time as the current picture. For example, assume that the current picture and the temporal picture are pictures of a current view. Also, assume that the motion vector for the temporal picture refers to a picture in another view. In this example, multiview coding may require that the temporal picture and the picture in the other view be displayed at the same time.

The time when a picture is displayed may be defined by the picture order count (POC) value of the picture. For example, a picture with a smaller POC value may be displayed earlier than a picture with a larger POC value. The display time of a picture should not be confused with the coding time of the picture. For example, a picture with a smaller POC value may be displayed earlier than a picture with a larger POC value, but the picture with a smaller POC value may be coded later than when the picture with larger POC value is coded.

In multiview coding, pictures in different views that are to be displayed at the same time may be assigned the same POC value. For example, the POC value of the temporal picture and the POC value of the picture in the other view, to which the motion vector or vectors of the temporally neighboring block refer, may be the same. Also, in multiview coding, when a picture in a first view utilizes a picture in the second view for inter-prediction, the picture in the second view may be considered as "used for long-term reference" at the instance when the picture in the first view is coded.

In the techniques described in this disclosure, when video encoder 20 and video decoder 30 construct RefPicList0 and/or RefPicList1 for a picture, video encoder 20 and video decoder 30 may include a picture from a different view in either or both reference picture lists. For example, RefPicList0 and RefPicList1 may identify POC values of the reference pictures. If the POC value for a reference picture identified in RefPicList0 or RefPicList1 is different than the POC value of the picture being coded, then the reference picture belongs to the same view as the picture being coded. If the POC value for a reference picture identified in RefPicList0 or RefPicList1 is the same as the POC value of the picture being coded, then the reference picture belongs to a different view than the picture being coded.

As described above, the reference picture that belongs to a different view than the picture being coded may be designated as "used for long-term reference" at the instance when the picture is being coded. In some examples, video encoder 20 and video decoder 30 may set the value of usedForLongTermX[i] equal to one, if the picture identified by RefPicListX[i] has the same POC value as the picture being coded. In these examples, video encoder 20 and video decoder 30 may set the value of usedForLongTermX[i] equal to zero, if the picture identified by RefPicListX[i] does not have the same POC value as the picture being coded.

For instance, in some examples, video encoder 20 and video decoder 30, when coding a picture, may set the value of usedForLongTermX[i] equal to one, if the reference picture identified by RefPicListX[i] is designated as "used for long-term reference," and zero otherwise. These examples may be applicable to both multiview coding and non-multiview coding.

In some alternative examples, video encoder 20 and video decoder 30, when coding a picture, may set the value of usedForLongTermX[i] equal to one, if the reference picture identified by RefPicListX[i] has the same POC value as the picture being coded, and zero otherwise. In these alternative examples, if the reference picture identified by RefPicListX[i] is designated as "used for long-term reference," but does not have the same POC value as the picture being coded, then video encoder 20 and video decoder 30 may set the value of usedForLongTermX[i] equal to zero. For instance, in these alternative examples, even if a reference picture is designated as "used for long-term reference," when the picture is being coded, video encoder 20 and video decoder 30 may set the entry of usedForLongTermX, that corresponds to the reference picture, equal to zero, if the POC value of the reference picture is different than the POC value of the picture being coded. These alternative examples may be more applicable to multiview coding, but may be usable with non-multiview coding as well.

In other words, in some examples, the value of usedForLongTermX[i] is based on whether the reference picture identified by RefPicListX[i] is marked as "used for long-term reference" or not marked as "used for long-term reference." In some alternative examples, the value of usedForLongTermX[i] is based on whether the reference picture identified by RefPicListX[i] has the same POC value as the picture being coded or does not have the same POC value as the picture being coded. In either of the examples, video encoder 20 and video decoder 30 may implement the LongTermRefPic function for a picture based on the values of the usedForLongTermX list of flags associated with that picture.

As described above, in some examples, to conform with the requirements with the HEVC standard (as one non-limiting example), the techniques allow for video encoder 20 and video decoder 30 to determine the status information of a reference picture of a temporal picture at the instance the temporal picture was coded. The following describes one example reason why video encoder 20 and video decoder 30 may determine the status information of a reference picture of a temporal picture at the instance the temporal picture was code. It should be understood that this description is provided solely for purposes of illustration and should not be considered limiting. Again, the techniques described in this disclosure are not limited to the HEVC standard, or limited to merge or AMVP mode.

During merge or AMVP mode, when video encoder 20 or video decoder 30 determines whether to include a spatial or temporal candidate motion vector (i.e., an SMVP or TMVP) into the merge or AMVP candidate list, video encoder 20 or video decoder 30 may compare the long-term or short-term status of the target reference picture (e.g., the temporal picture) and that of the reference picture of the candidate motion vector (e.g., the reference picture of the temporal picture). In some cases, only when the statuses of both of these pictures are the same (at the time of the coding of the temporal picture), the candidate motion vector is added into the candidate list. Such a process is needed and the same process may exist for both video encoder 20 and video decoder 30.

In accordance with the techniques described in this disclosure, to access the status of the reference picture which a temporal candidate motion vector refers to (e.g., the reference picture of the temporal picture), usedForLongTermX [refIdx] of picX can be used, wherein picX is the co-located picture (e.g., the temporal picture). For example, if usedForLongTermX[refIdx] of picX is 1, it means the reference picture with a refIdx of RefPicListX of picX is a long-term reference picture, and otherwise a short-term reference picture. In this example, the reference picture with refIdx of RefPicListX is the reference picture to picX, and picX refers to the temporal picture. The temporal picture includes the temporally neighboring block whose motion vector information may potentially be used to determine the motion vector information for the current block.

In this way, a video coder (e.g., video encoder 20 or video decoder 30) may be configured to the implement the techniques. For example, the video coder may store reference status information of one or more reference pictures of a first picture, where the reference status information indicates the reference status information of the one or more reference pictures at an instance when the first picture is coded. The video coder may code a video block within a second, different picture based on the stored reference status information, at the instance when the first picture was coded, of the one or more reference pictures of the first picture. In some examples, a reference status of a reference picture of the one or more reference pictures, at the instance when the first picture is coded, is different than a reference status of the reference picture at an instance when the second picture is coded.

The video coder may construct at least one reference picture list for the first picture. The video coder may store reference status information for each of the reference pictures identified in the at least one reference picture list. For example, the video coder may store the usedForLongTermX list of flags for the first picture. In some examples, the usedForLongTermX list of flags may store a value for a reference picture of the reference pictures of the first picture that indicates whether the reference picture is designated as "used for long-term reference" or not designated as "used for long-term reference." In some examples, the usedForLongTermX list of flags may store a value for a reference picture of the reference pictures of the second picture that indicates whether the picture order count (POC) value of the reference picture is a same POC value as a POC value of the first picture or the POC value of the reference picture is different than the POC value of the first picture.

In some examples, the video coder may determine whether a motion vector for the video block in the second picture is to be derived from a motion vector of a video block in the first picture (e.g., a TMVP is to be used in merge/skip mode or AMVP mode). When the motion vector for the video block in the second picture is to be derived from the motion vector of the video block in the first picture, the video coder may determine a reference picture of the one or more reference pictures of the first picture to which the motion vector of the video block in the first picture refers. The video coder may determine a reference status of the determined reference picture, at the instance when the first picture is coded, based on the stored reference status information. In these examples, the video coder may code (e.g., encode or decode) the video block within the second picture based on the determined reference status.

Figure 2:
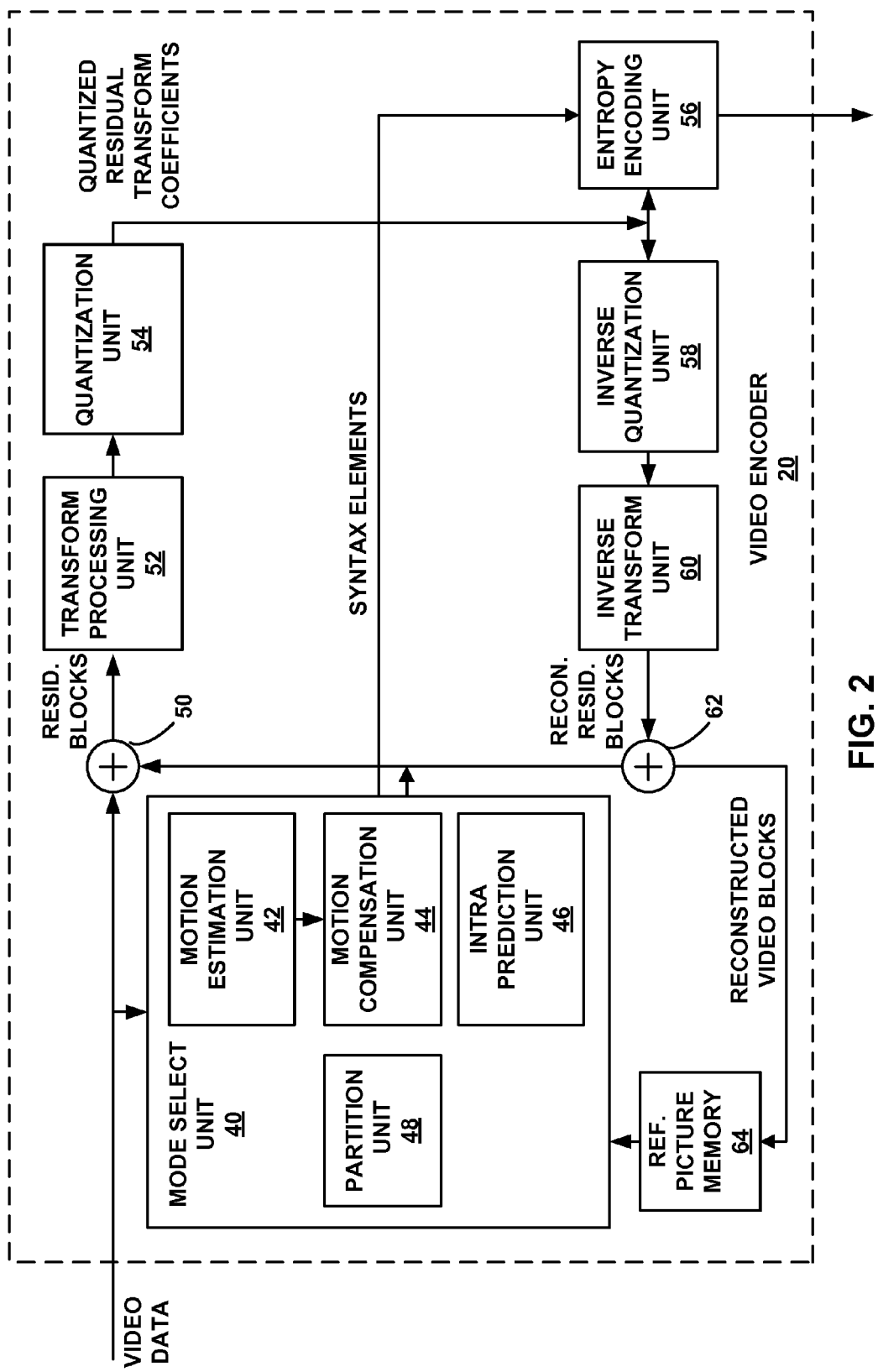
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding (i.e., intra-prediction or inter-prediction) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-prediction (P mode) or bi-prediction (B mode), may refer to any of several temporal-based compression modes.

As shown in FIG. 2, video encoder 20 receives a current video block within a video picture to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion estimation unit 42, motion compensation unit 44, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

In some examples, mode select unit 40 or mode select unit 40 in conjunction with other units of video encoder 20 may implement the techniques described in this disclosure. For example, mode select unit 40 may store the reference status information for reference pictures of a first picture, at the instance when video encoder 20 encoded the first picture. Mode select unit 40 may inter-predict a block of a second picture based on the reference status information for reference pictures of the first picture, at the instance when video encoder 20 encoded the first picture.

As one example, to inter-predict the block in the second picture, mode select unit 40 may determine that the motion vector of the block in the second picture is to be determined from the motion vector of a block in the first picture. In this example, mode select unit 40 may utilize the reference status information for the reference pictures of the second picture to determine the motion vector of the block in the second picture. Mode select unit 40 may store the reference status information of the reference pictures of the first picture, at the instance when the first picture is coded, in reference picture memory 64. Reference picture memory 64 is one example of a decoded picture buffer (DPB) of video encoder 20.

Aspects of this disclosure are not limited to mode select unit 40 implementing the techniques described in this disclosure. In some examples, a processor or a processing unit (not specifically illustrated) may implement the techniques described in this disclosure. Also, a buffer, other than reference picture memory 64, may store the reference status information of reference pictures of a picture.

During the encoding process, video encoder 20 receives a video picture or slice to be coded. The picture or slice may be divided into multiple video blocks. Motion estimation unit 42 and motion compensation unit 44 perform inter-predictive coding of the received video block relative to one or more blocks in one or more reference pictures to provide temporal compression. Intra-prediction unit 46 may alternatively perform intra-predictive coding of the received video block relative to one or more neighboring blocks in the same picture or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a picture or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 may be configured to determine the inter-prediction mode for a video slice according to a predetermined pattern for a video sequence. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

As described above, the motion vector predictor may be the motion vector for a block other than the current block, and may possibly be a motion vector for a neighboring block. Motion estimation unit 42 may also determine the motion vector difference (MVD). For example, motion estimation unit 42 may determine the difference (e.g., the delta of the X-coordinate and the delta of the Y-coordinate) between the motion vector for the current block and the motion vector predictor.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (RefPicList0) or a second reference picture list (RefPicList1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan during entropy coding.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video picture.

Figure 3:
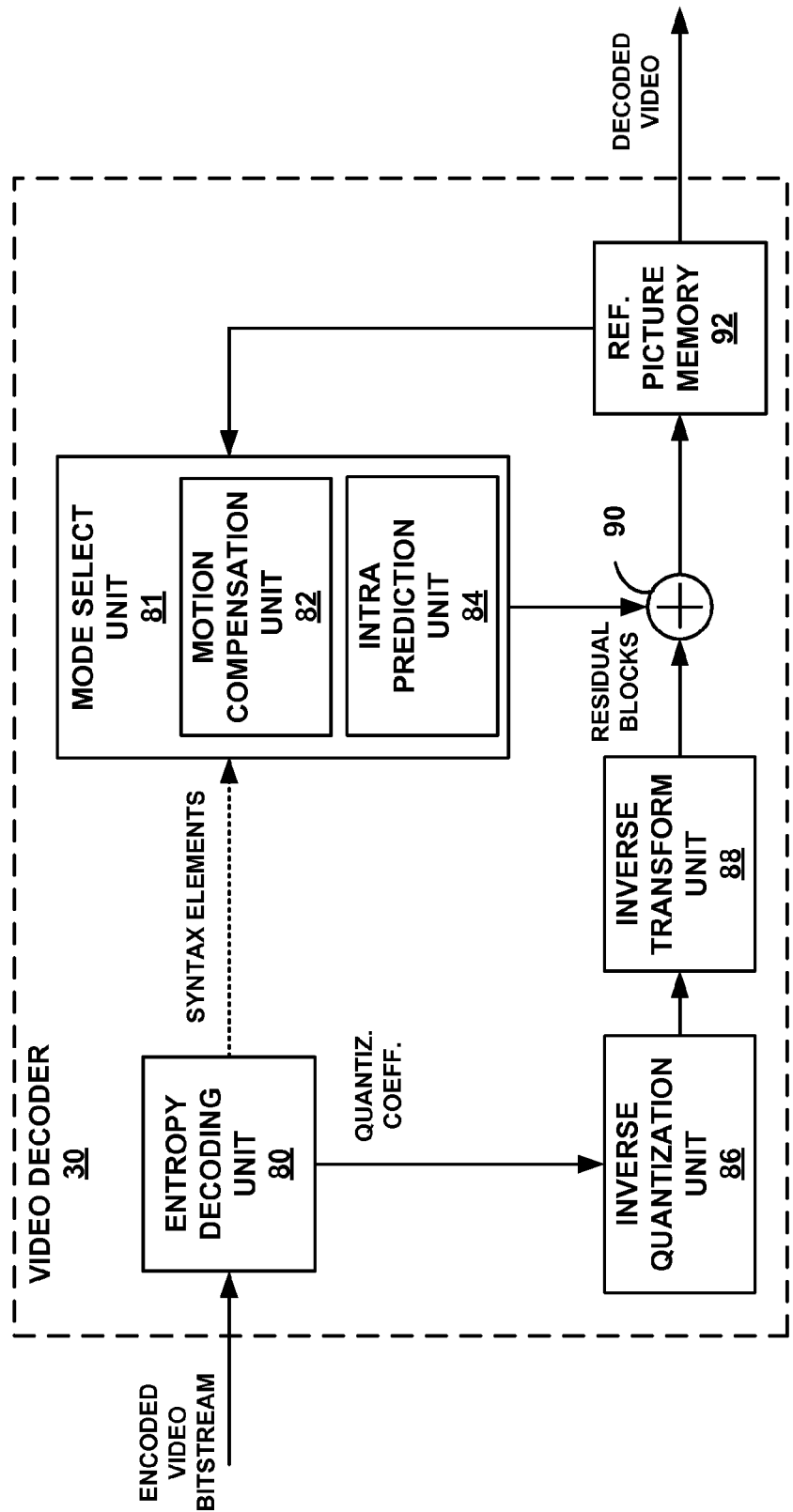
FIG. 3 is a block diagram illustrating an example video decoder that may implement the techniques described in this disclosure.

FIG. 3 is a block diagram illustrating an example video decoder 30 that may implement the techniques described in this disclosure. In the example of FIG. 3, video decoder 30 includes an entropy decoding unit 80, mode select unit 81, inverse quantization unit 86, inverse transformation unit 88, summer 90, and reference picture memory 92. Mode select unit 81 includes motion compensation unit 82 and intra prediction unit 84. Video decoder 30 may, in some examples, perform a decoding pass generally reciprocal to the encoding pass described with respect to video encoder 20 from FIG. 2.

In some examples, mode select unit 81 or mode select unit 81 in conjunction with other units of video decoder 30 may implement the techniques described in this disclosure. For example, mode select unit 81 may store the reference status information for reference pictures of a first picture, at the instance when video decoder 30 decoded the first picture. Mode select unit 81 may inter-predict a block of a second picture based on the reference status information for reference pictures of the first picture, at the instance when video decoder 30 decoded the first picture.

As one example, to inter-predict the block in the second picture, mode select unit 81 may determine that the motion vector of the block in the second picture is to be determined from the motion vector of a block in the first picture. In this example, mode select unit 81 may utilize the reference status information for the reference pictures of the second picture to determine the motion vector of the block in the second picture. Mode select unit 81 may store the reference status information of the reference pictures of the first picture, at the instance when the first picture is coded, in reference picture memory 92. Reference picture memory 92 is one example of a decoded picture buffer (DPB) of video decoder 30.

Aspects of this disclosure are not limited to mode select unit 81 implementing the techniques described in this disclosure. In some examples, a processor or a processing unit (not specifically illustrated) may implement the techniques described in this disclosure. Also, a buffer, other than reference picture memory 92, may store the reference status information of reference pictures of a picture.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to mode select unit 81. Video decoder 30 may receive the syntax elements at the video slice level and/or the video block level.

When the video slice is coded as an intra-coded (I) slice, intra prediction unit 84 of mode select unit 81 may generate prediction data for a video block of the current video slice based on a signaled intra prediction mode and data from previously decoded blocks of the current frame or picture. When the video picture is coded as an inter-coded (i.e., B or P) slice, motion compensation unit 82 of mode select unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference picture lists, RefPicList0 and RefPicList1, using default construction techniques or any other technique based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes (i.e., de-quantizes), the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 4:
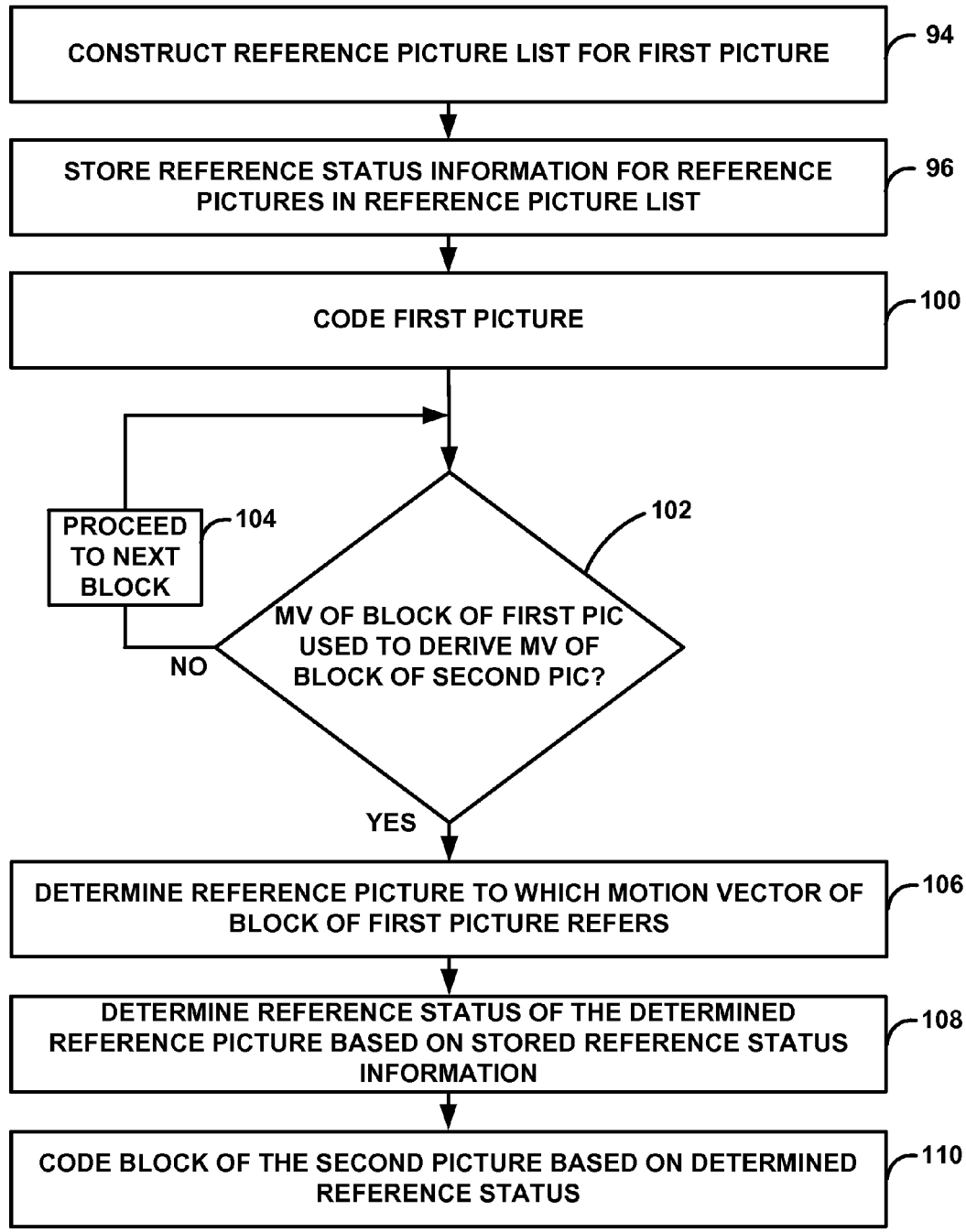
FIG. 4 is a flowchart illustrating an example operation in accordance with one or more example techniques described in this disclosure.

FIG. 4 is a flowchart illustrating an example operation in accordance with one or more example techniques described in this disclosure. A video coder may be configured to implement the example techniques illustrated in FIG. 4. Examples of the video coder include video encoder 20 or video decoder 30.

As illustrated in FIG. 4, the video coder may construct a reference picture list for a first picture (e.g., RefPicList0 and/or RefPicList1 for the first picture) (94). The video coder may store the reference status information for the reference pictures identified in the reference picture list (96). For example, the video coder may store the usedForLongTermX[i] list of flags.

In some examples, the video coder stores a value in usedForLongTermX[i] that indicates whether the reference picture identified by RefPicListX[i] is designated as "used for long-term reference" or not designated as "used for long-term reference," at the instance when the first picture is coded. In some examples, the video coder stores a value in usedForLongTermX[i] that indicates whether a picture order count (POC) value of the first picture is the same as the POC value of the reference picture identified by RefPicListX[i] or not the same as the POV value of the reference picture identified by RefPicListX[i].

The video coder may code the first picture (100). In some examples, the video coder may perform inter-prediction on the video blocks of the first picture based on the reference pictures identified in the constructed reference picture list. After coding the first picture, the video coder may code a second, different picture.

For example, the video coder may determine whether a motion vector of a video block in the first picture is used to derive a motion vector of a video block in the second picture (102). As one example, the video coder may determine whether the motion vector of the video block in the first picture is to form a TMVP for the video block in the second picture. As another example, the video coder may determine whether the TMVP is to be used to derive the motion vector for the video block in the second picture.

If the motion vector of the video block in the first picture is not to be used to derive the motion vector of the video block in the second picture (NO of 102), the video coder may proceed to the next block, which may then form the current block that is being predicted (104). The video coder may then repeat determining whether a motion vector of a video block in the first picture is used to derive a motion vector of the current block in the second picture.

If the motion vector of the video block in the first picture is to be used to derive the motion vector of the video block in the second picture (YES of 102), the video coder may determine the reference picture to which the motion vector of the video block of the first picture refers (106). For example, the video coder may determine the reference index into the constructed reference picture list of the motion vector. The video coder may use the reference index to determine the reference picture to which the motion vector referred.

The video coder may determine the reference status of the determined reference picture based on the stored reference status information (108). For example, the video coder may utilize the reference index of the motion vector of the first block as an input into the usedForLongTermX list of flags for the first picture. For instance, assume that the constructed reference picture list for the first picture is RefPicList0. Also, assume that the reference index into RefPicList0 is refIdx0. In this example, the video coder may determine the value stored in usedForLongTerm0[refIdx0] for the first picture to determine the reference status of the reference picture identified by RefPicList0[refIdx0] for the first picture.

The video coder may code the video block of the second picture based on the determine reference status (110). In this manner, the techniques described in this disclosure may allow for video encoder 20 and video decoder 30 to conform to the requirements of the HEVC standard. However, as described above, the techniques described in this disclosure should not be considered limited to the HEVC standard, and are extendable to other standards, as well as any video coding technique.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   storing reference status information of one or more reference pictures of a first picture, the reference status information indicating reference status of the one or more reference pictures at an instance when the first picture is coded;
   associating the stored reference status information with the instance when the first picture was coded;
   determining a video block in the first picture and a motion vector of the video block in the first picture, wherein the motion vector of the video block in the first picture refers to a reference picture from the one or more reference pictures of the first picture based on a reference index of the motion vector for the video block in the first picture;
   based on a motion vector for a video block in a second picture being coded, which is different than the first picture, being derived from the motion vector of the video block in the first picture, determining a reference status of the reference picture, at the instance when the first picture was coded, based on the stored reference status information associated with the instance when the first picture was coded; and
   coding the video block within the second picture based on the stored reference status information of the reference picture at the instance when the first picture was coded,
   wherein the reference status of the reference picture of the one or more reference pictures, at the instance when the first picture was coded, is different than the reference status of the reference picture at the instance when the second picture is coded.

2. The method of claim 1, further comprising:
   constructing at least one reference picture list for the first picture, wherein the at least one reference picture list identifies at least one of the one or more reference pictures of the first picture,
   wherein storing the reference status information comprises storing reference status information for the at least one of the one or more reference pictures of the first picture identified in the at least one reference picture list.

3. The method of claim 1, further comprising:
   constructing at least one reference picture list for the first picture, wherein the at least one reference picture list identifies the one or more reference pictures of the first picture,
   wherein storing the reference status information comprises storing reference status information for all of the one or more reference pictures of the first picture identified in the at least one reference picture list.

4. The method of claim 1, wherein storing the reference status information comprises storing a value for a reference picture of the one or more reference pictures of the first picture that indicates whether the reference picture is designated as used for long-term reference or not designated as used for long-term reference.

5. The method of claim 1, wherein storing the reference status information comprises storing a value for a reference picture of the one or more reference pictures of the first picture that indicates whether a picture order count (POC) value of the reference picture is a same POC value as a POC value of the first picture or the POC value of the reference picture is different than the POC value of the first picture.

6. The method of claim 1, the method further comprising:
storing reference status information of one or more reference pictures of a third picture, the reference status information indicating reference status of the one or more reference pictures of the third picture at an instance when the third picture is coded; and
associating the stored reference status information of the one or more reference pictures of the third picture with the instance when the third picture was coded,
wherein a motion vector of a video block of the third picture is not used to predict a motion vector of a video block of the fourth picture if the reference status of the third picture at a time of coding of the fourth picture is different from the stored reference status of a reference picture, of the third picture, associated with the instance when the third picture was coded.

7. The method of claim 6, further comprising not adding the motion vector of the video block of the third picture as a candidate in an advanced motion vector prediction (AMVP) or merge candidate list for prediction of the motion vector of the video block of the fourth picture.

8. The method of claim 1,
wherein storing comprises storing, with a video encoder, the reference status information of one or more reference pictures of the first picture, the reference status information indicating the reference status of the one or more reference pictures at the instance when the first picture is encoded, and
wherein coding comprises encoding, with the video encoder, the video block within the second picture based on the stored reference status information of the reference picture at the instance when the first picture was encoded.

9. The method of claim 1,
wherein storing comprises storing, with a video decoder, the reference status information of one or more reference pictures of the first picture, the reference status information indicating the reference status of the one or more reference pictures at the instance when the first picture is decoded, and
wherein coding comprises decoding, with the video decoder, the video block within the second picture based on the stored reference status information of the reference picture at the instance when the first picture was decoded.

10. An apparatus for coding video data, the apparatus comprising:
a memory device; and
a video coder comprising processing circuitry, the video coder configured to:
store, in the memory device, reference status information of one or more reference pictures of a first picture, the reference status information indicating reference status of the one or more reference pictures at an instance when the first picture is coded;
associate the stored reference status information with the instance when the first picture was coded;
determine a video block in the first picture and a motion vector of the video block in the first picture, wherein the motion vector of the video block in the first picture refers to a reference picture from the one or more reference pictures of the first picture based on a reference index of the motion vector for the video block in the first picture;
based on a motion vector for a video block in a second picture being coded, which is different than the first picture, being derived from the motion vector of the video block in the first picture, determine a reference status of the reference picture, at the instance when the first picture was coded, based on the stored reference status information associated with the instance when the first picture was coded; and
code the video block within the second picture based on the stored reference status information of the reference picture at the instance when the first picture was coded,
wherein the reference status of the reference picture of the one or more reference pictures, at the instance when the first picture was coded, is different than the reference status of the reference picture at the instance when the second picture is coded.

11. The apparatus of claim 10, wherein the video coder is configured to:
construct at least one reference picture list for the first picture, wherein the at least one reference picture list identifies at least one of the one or more reference pictures of the first picture,
wherein, to store the reference status information, the video coder is configured to store reference status information for the at least one of the one or more reference pictures of the first picture identified in the at least one reference picture list.

12. The apparatus of claim 10, wherein the video coder is configured to:
construct at least one reference picture list for the first picture, wherein the at least one reference picture list identifies the one or more reference pictures of the first picture,
wherein, to store the reference status information, the video coder is configured to store reference status information for all of the one or more reference pictures of the first picture identified in the at least one reference picture list.

13. The apparatus of claim 10, wherein, to store the reference status information, the video coder is configured to store a value for a reference picture of the one or more reference pictures of the first picture that indicates whether the reference picture is designated as used for long-term reference or not designated as used for long-term reference.

14. The apparatus of claim 10, wherein, to store the reference status information, the video coder is configured to store a value for a reference picture of the one or more reference pictures of the first picture that indicates whether a picture order count (POC) value of the reference picture is a same POC value as a POC value of the first picture or the POC value of the reference picture is different than the POC value of the first picture.

15. The apparatus of claim 10, wherein the video coder is configured to:
store, in the memory device, reference status information of one or more reference pictures of a third picture, the reference status information indicating reference status of the one or more reference pictures of the third picture at an instance when the third picture is coded; and
associate the stored reference status information of the one or more reference pictures of the third picture with the instance when the third picture was coded,
wherein a motion vector of a video block of the third picture is not used to predict a motion vector of a video block of the fourth picture if the reference status of the third picture at a time of coding of the fourth picture is different from the stored reference status of a reference picture, of the third picture, associated with the instance when the third picture was coded.

16. The apparatus of claim 15, wherein the video coder is configured to not add the motion vector of the video block of the third picture as a candidate in an advanced motion vector prediction (AMVP) or merge candidate list for prediction of the motion vector of the video block of the fourth picture.

17. The apparatus of claim 10, wherein the video coder comprises a video decoder, and wherein the video decoder is configured to:
store, in the memory device, the reference status information of the one or more reference pictures of the first picture; and
decode the video block within the second picture based on the stored reference status information of the reference picture at the instance when the first picture was coded.

18. The apparatus of claim 10, wherein the video coder comprises a video encoder, and wherein the video encoder is configured to:
store, in the memory device, the reference status information of the one or more reference pictures of the first picture; and
encode the video block within the second picture based on the stored reference status information of the reference picture at the instance when the first picture was coded.

19. The apparatus of claim 10, wherein the apparatus comprises at least one of:
a wireless communication device;
a microprocessor;
an integrated circuit;
a display configured to display the first and second pictures; or
a camera configured to capture the first and second pictures.

20. An apparatus for coding video data, the apparatus comprising:
means for storing reference status information of one or more reference pictures of a first picture, the reference status information indicating reference status of the one or more reference pictures at an instance when the first picture is coded;
means for associating the stored reference status information with the instance when the first picture was coded;
means for determining a video block in the first picture and a motion vector of the video block in the first picture, wherein the motion vector of the video block in the first picture refers to a reference picture from the one or more reference pictures of the first picture based on a reference index of the motion vector for the video block in the first picture;
means for determining a reference status of the reference picture, at the instance when the first picture was coded, based on the stored reference status information associated with the instance when the first picture was coded and based on a motion vector for a video block in a second picture being coded, which is different than the first picture, being derived from the motion vector of the video block in the first picture; and
means for coding the video block within the second picture based on the stored reference status information of the reference picture at the instance when the first picture was coded,
wherein the reference status of the reference picture of the one or more reference pictures, at the instance when the first picture was coded, is different than the reference status of the reference picture at the instance when the second picture is coded.

21. A non-transitory computer-readable storage medium having instructions stored thereon that when executed cause one or more processors to:
store reference status information of one or more reference pictures of a first picture, the reference status information indicating reference status of the one or more reference pictures at an instance when the first picture is coded;
associate the stored reference status information with the instance when the first picture was coded;
determine a video block in the first picture and a motion vector of the video block in the first picture, wherein the motion vector of the video block in the first picture refers to a reference picture from the one or more reference pictures of the first picture based on a reference index of the motion vector for the video block in the first picture;
based on a motion vector for a video block in a second picture being coded, which is different than the first picture, being derived from the motion vector of the video block in the first picture, determine a reference status of the reference picture, at the instance when the first picture was coded, based on the stored reference status information associated with the instance when the first picture was coded; and
code the video block within the second picture based on the stored reference status information of the reference picture at the instance when the first picture was coded,
wherein the reference status of the reference picture of the one or more reference pictures, at the instance when the first picture was coded, is different than the reference status of the reference picture at the instance when the second picture is coded.

* * * * *